UNITED STATES PATENT OFFICE.

RICHARD E. THIERFELDER AND JOHN SCHMAELZLE, JR., OF MILWAUKEE, WISCONSIN.

PRESERVATIVE COMPOSITION FOR TREATING RUBBER FABRIC.

1,312,007.  Specification of Letters Patent.  Patented Aug. 5, 1919.

No Drawing.  Application filed November 10, 1917. Serial No. 201,225.

*To all whom it may concern:*

Be it known that we, RICHARD E. THIERFELDER and JOHN SCHMAELZLE, Jr., citizens of the United States, residing at Milwaukee, in the county of Milwaukee and State of Wisconsin, have invented a certain new and useful Improvement in Preservative Composition for Treating Rubber Fabric, of which the following is a full, clear, concise, and exact description.

Our invention relates to an improved preservative composition of matter for treating various forms of rubber, rubber fabric and the like to increase their durability and to make the material of such articles more tenacious.

The composition of our invention is particularly adapted for treating those forms of rubber that are to be subjected to severe usage such as automobile tires and the like. We have found by careful experiment that the mileage of tires treated with our improved composition will be greatly increased as it will preserve the rubber and make it less absorptive of oxygen and it will also obviate such destructive formations as sand-blisters, usually caused by some foreign substance being ground into the pores of the fabric. It also will prevent the rubber from cracking or becoming brittle.

A further object of our invention is to provide such a composition for treating tires to increase their mileage that will preserve rather than cause deterioration of the rubber as has heretofore been a common fault and for this purpose the invention consists of a preservative composition of matter made of a mixture containing resin, rubber-cement, fish-glue, glycerin, turpentine and a preservative filling material such as tar and pitch.

In preparing this composition it has been found to be best adapted for the purposes above set forth when the ingredients are mixed in about the following proportions:

8 parts by weight of tar
100 " " " " pitch
200 " " " " resin
50 " " " " rubber-cement
50 " " " " fish-glue
200–300 " " " " glycerin
200–300 " " " " turpentine The tar and pitch serve as a preservative filler for filling the pores of the rubber or rubber fabric to prevent particles of sand, gravel or the like from entering the same, and in case the tires to be treated have been in use the tar and pitch will serve to fill any cracks or crevices that may have been formed in them due to service. It will be found that the preservative filler we employ will serve to make the fabric less absorptive of oxygen, thereby minimizing the possibility of the fabric's becoming brittle and cracking, the resin serves as a drier, the fish-glue and rubber-cement such as dissolved melted gutta-percha or any other convenient form serve to impart the adhesive property to the composition, the glycerin serves to keep the composition flexible so that it will bend with the fabric without danger of separating therefrom or of cracking or breaking, while the turpentine serves as a drier and as a solvent for thinning the composition to any desired consistency.

In preparing the composition of our invention the tar, pitch, resin, rubber-cement, fish-glue and glycerin should be placed in a suitable vessel and steamed for about one hour without boiling, during which time the mixture should be continually mixed or agitated, either manually or if desired by a mechanical mixer or agitator. The composition thus formed may be brought to the proper consistency as required for various uses by solution in turpentine, although any other suitable solvent may be employed. For treating tires the composition is preferably thinned with turpentine until it may be readily applied with an ordinary paint brush.

In practice it has been found advisable to carefully wash the tires to be treated in gasolene before treating them to remove all sand and grit and to open the pores of the rubber. The composition which has been thinned to the proper consistency is then applied to the surface of the tire by means of a brush or otherwise whereby it fills all the pores, cracks and interstices in the fabric forming a preservative filler and coating for the tire, which coating may be of any desired thickness. Tires that are in constant use should receive one application of our improved preservative composition at about every three to four hundred miles and it will be found to serve admirably to preserve the fabric of tires that are to be stored for varying periods as is often the case where automobiles are stored for the winter.

It will be apparent to those skilled in the art from the foregoing description that our invention is not to be limited to use in connection with automobile tires as the proportions of the ingredients can be changed according to the object for which the composition is to be used, it is obvious that for some purposes a thin liquid, while for other purposes a composition of pasty consistency and for still other purposes a thick composition may be required.

It will now be apparent that, as the turpentine serves to give the composition the desired consistency, when a thick composition or a composition of pasty consistency is desired less turpentine is used than when a thin liquid is desired. Upon decreasing the amount of turpentine used in order to produce a thicker composition, the drying quality of the composition will be correspondingly decreased. We overcome this by employing resin with the decreased portion of turpentine to maintain the drying quality of the composition and at the same time to provide a thicker composition.

The composition forms a very superior protection to the articles on which it may be used owing to its durability as well as its adaptability to expand, contract and change form with such articles.

What we claim is:

1. A preservative composition comprising a mixture of tar, pitch, resin, rubber cement, fish-glue and glycerin.

2. A preservative composition comprising a mixture of tar, pitch, resin, rubber-cement, fish-glue, glycerin and turpentine.

3. A preservative composition comprising a mixture of a hydro-carbon, rubber cement, fish-glue, glycerin and a drier.

4. A composition for treating rubber fabric and the like, consisting of a mixture of tar, pitch and glycerin with a drier and an adhesive substance.

5. A composition for treating rubber fabric and the like formed by mixing the following ingredients tar, pitch and glycerin with an adhesive substance and a drier and bringing said mixture to the desired consistency by solution in a solvent.

6. A composition for treating rubber fabric and the like comprising a mixture of resin, rubber cement and fish-glue with a hydro-carbon filler.

In witness whereof, we hereunto subscribe our names this 5th day of November, A. D. 1917.

RICHARD E. THIERFELDER.
JOHN SCHMAELZLE, Jr.